No. 843,601.

PATENTED FEB. 12, 1907.

A. O. HEDFORS.
BOX BEARING.
APPLICATION FILED JUNE 29, 1905.

Witnesses
Karl Runeskog
John Delmar

Inventor
Arvid O. Hedfors
by Orostald
his atty

UNITED STATES PATENT OFFICE.

ARVID OTTO HEDFORS, OF UPSALA, SWEDEN.

BOX-BEARING.

No. 843,601.     Specification of Letters Patent.     Patented Feb. 12, 1907.

Application filed June 29, 1905. Serial No. 267,583.

*To all whom it may concern:*

Be it known that I, ARVID OTTO HEDFORS, a subject of the King of Sweden, and a resident of Upsala, Sweden, have invented new and useful Improvements in Box-Bearings, of which the following is a specification, reference being had to the drawings accompanying and forming a part hereof.

The present invention relates to a box-bearing for quickly rotating shafts, more particularly for the spindles of centrifugal separator-bowls, with a view of reducing the friction to a minimum and of providing a sure guide to the shaft without preventing the latter from a sidewise motion within certain limits from its central position.

The invention consists chiefly in having a bushing or the like within which is arranged one part of a ball-bearing the outer circumference of which partly bears on the bushing and is made spherical in such a manner that this part of the ball-bearing can oscillate freely in the bushing though being prevented to a certain degree from so doing by means of one or more spiral or otherwise-shaped springs inserted in the surrounding bushing and bearing with one end on the said ball-bearing part and with the other end against a suitable rim or the like in the bushing, thus forcing the said ball-bearing part against a suitable abutment on the bushing.

In the accompanying drawings one form of the invention is shown.

Figure 1:
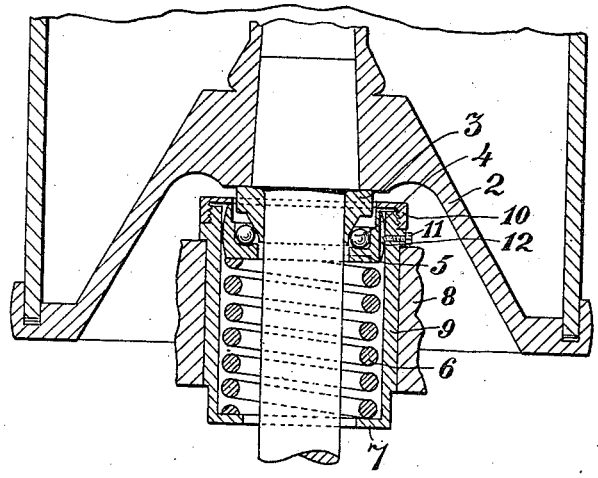
Figure 2:
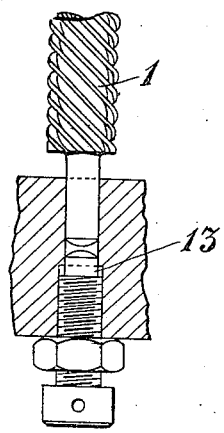

Figure 1 represents a vertical section of the box-bearing and a portion of a separating-bowl. Fig. 2 represents the lower portion of the separator-spindle and part of the frame in section.

On the spindle 1 and beneath the bottom 2 of the bowl is arranged one part 3 of a ball-bearing, which part either may be made in one piece with the spindle 1 or, as is shown in the drawings, in the shape of a ring slipped over the spindle. The said part 3 of the ball-bearing is preferably tapering and rests on a number of balls 4, arranged in a second ball-bearing part 5, resting on the upper end of a spiral spring 6, the lower end of which rests on a rim or shoulder 7 at the lower end of a bushing 9, mounted in the frame 8 and in which the ball-bearing part 5 is retained by means of a collar 10 or the like, screwed or otherwise secured to the upper end of the bushing 9. The outer surface of the ball-bearing part 5 bearing on the bushing 9 is spherical, so that the said part 5 can oscillate against the action of the spring 6, and the spindle consequently will have freedom within certain limits to oscillate sidewise from its central position. To prevent the ball-bearing part 6 from rotating within the bushing 9, a screw 11 may be fixed in the bushing so as to engage with an axial groove 12 in the ball-bearing part 5.

In applying my box-bearing to centrifugal separators the pivot-bearing 13, Fig. 2, on which the bottom end of the spindle usually rests, is adjusted in such a manner that the spindle normally will not touch it, as shown in Fig. 2, and the drum and spindle will be supported by the spring 6. The running of the bowl, as a result, will be very quiet and easy.

The constructive details of the box-bearing above described evidently may be modified in various ways without departing from the leading idea of the invention. Thus, for instance, in place of one spring 6 two or more spiral or otherwise-shaped springs may be used, which are arranged to force the ball-bearing part 5 against the collar 10 or other suitable abutment. The shape of the ball-bearing part 3 is immaterial.

One particular advantage of a box-bearing according to the present invention is its adaptability also to old separators without the need of alterations, since the bearing may be made of such dimensions that the bushing 9 will fit accurately in the usual bore for the box-bearing in the frame, it being only necessary to slip the ball-bearing part 3 onto the spindle.

Having now described my invention and how it may be carried out, what I claim is—

In a box-bearing for quickly-revolving shafts the combination of, a substantially cylindrical bushing having an inwardly-projecting shoulder, a ball-bearing part with spherical outer surface arranged therein so as to be free to oscillate within the bushing, a spring actuating the said ball-bearing part in axial direction against the said shoulder, another ball-bearing part provided on the shaft, and balls between said ball-bearing parts, substantially as and for the purpose set forth.

In testimony whereof I have signed my name to this specification in the presence of two subscribing witnesses.

ARVID OTTO HEDFORS.

Witnesses:
    EVALD DELMAR,
    KARL RUNCSKOG.